(12) United States Patent
Fu

(10) Patent No.: US 7,821,693 B1
(45) Date of Patent: Oct. 26, 2010

(54) MEMS MIRROR WITH ROTATION AMPLIFICATION AND ELECTROMAGNETIC DRIVE

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 289 days.

(21) Appl. No.: 11/951,277

(22) Filed: Dec. 5, 2007

Related U.S. Application Data

(60) Provisional application No. 60/868,875, filed on Dec. 6, 2006.

(51) Int. Cl.
G02B 26/08 (2006.01)

(52) U.S. Cl. .................................................. 359/224.1

(58) Field of Classification Search ... 359/223.1–226.1, 359/290, 291, 871, 872
See application file for complete search history.

(56) References Cited

U.S. PATENT DOCUMENTS 6,735,004 B1  5/2004  Hagelin et al.

7,095,156 B2 *  8/2006  Yoda ........................ 359/224.1
7,382,510 B2 *  6/2008  Yoda ........................ 359/224.1

FOREIGN PATENT DOCUMENTS

| EP | 1528422 A1 | 5/2005 |
|---|---|---|
| JP | 2006269186 | 9/1994 |
| JP | 2005181394 | 7/2005 |

OTHER PUBLICATIONS

M. Yoda et al., "A MEMS 1-D Optical Scanner for Laser Projection Display using Self-assembled Vertical Combs and Scan-angle Magnifying Mechanism," The 13th International Conference on Solid-State Sensors, Actuators and Microsystems, Seoul, Korea, Jun. 5-9, 2005, pp. 968-971.

PCT International Search Report and Written Opinion of the International Searching Authority, 12 pages.

* cited by examiner

*Primary Examiner*—Euncha P Cherry
(74) *Attorney, Agent, or Firm*—Patent Law Group LLP; David C. Hsia

(57) ABSTRACT

A micro-electro-mechanical system (MEMS) mirror device includes a mirror coupled to an actuator by a first torsional hinge along a rotational axis. The actuator has a body and a group of coils extending from the body. An anchor is coupled another end of the actuator by a second torsional hinge along the rotational axis.

12 Claims, 6 Drawing Sheets

MEMS MIRROR WITH ROTATION AMPLIFICATION AND ELECTROMAGNETIC DRIVE

CROSS REFERENCE TO RELATED APPLICATIONS

This application claims the benefit of U.S. Provisional Application No. 60/868,875, filed Dec. 6, 2006, which is incorporated herein by reference.

This application is related to (1) U.S. patent application Ser. No. 10/683,962, filed on Oct. 10, 2003, now U.S. Pat. No. 7,014,115, (2) U.S. patent application Ser. No. 10/910,384, filed on Aug. 2, 2004, now U.S. Pat. No. 6,985,279 (3) U.S. patent application Ser. No. 11/201,672, filed on Aug. 2, 2004, now U.S. Pat. No. 7,009,755, (4) U.S. patent application Ser. No. 11/263,795, filed on Oct. 31, 2005, now U.S. Pat. No. 7,301,689, and (5) U.S. patent application Ser. No. 11/695,595, filed on Apr. 2, 2007, which are incorporated herein by reference.

FIELD OF INVENTION

This invention relates to micro-electro-mechanical system (MEMS) devices, and more particularly to MEMS scanning mirrors.

DESCRIPTION OF RELATED ART

Various electromagnetic actuator designs for MEMS scanning mirrors have been proposed. The extensive applications of these devices include barcode readers, laser printers, confocal microscopes, projection displays, rear projection TVs, and wearable displays (e.g., micro displays). For these applications, the MEMS scanning mirrors typically need to have a great range of rotation. Thus, what is needed is a MEMS scanning mirror that has a great range of rotation.

SUMMARY

In one embodiment of the invention, a micro-electro-mechanical system (MEMS) mirror device includes a mirror coupled to an actuator by a first torsional hinge or spring along a rotational axis. The actuator has a body and a group of coils extending from the body. An anchor is coupled another end of the actuator by a second torsional hinge or spring along the rotational axis.

BRIEF DESCRIPTION OF THE DRAWINGS

Use of the same reference numbers in different figures indicates similar or identical elements.

DETAILED DESCRIPTION OF THE INVENTION

Figure 1A:
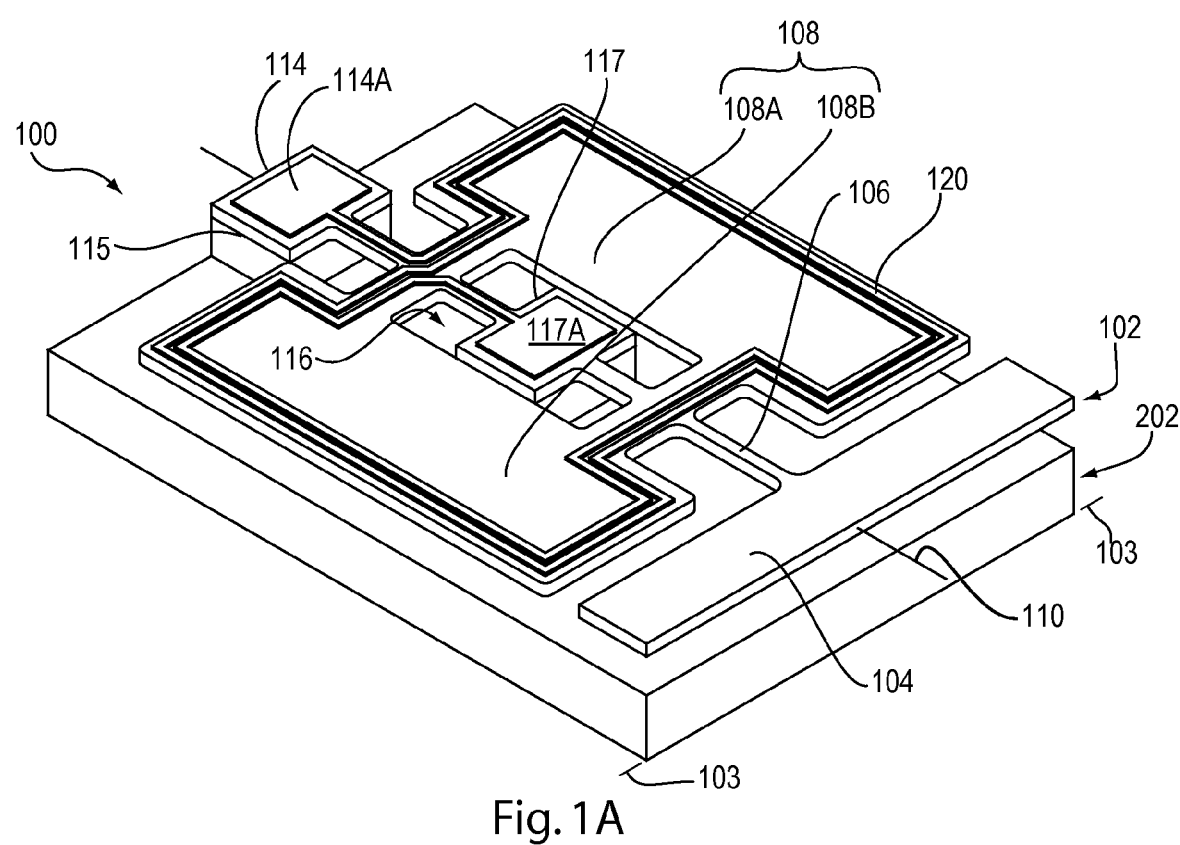
FIG. 1A illustrates a perspective cut-away view of a MEMS mirror device in one embodiment of the invention.

FIG. 1A partially illustrates a MEMS mirror device 100 along a vertical line of symmetry 103 in one embodiment of the invention. Device 100 includes an upper layer 102 bonded to but electrically insulated from a lower layer 202 (shown more clearly in FIG. 1B) by an optional insulation layer 105. Components on upper layer 102 and lower layer 202 can be formed from semiconductor or glass wafers using semiconductor or traditional processing techniques. In one embodiment, layers 102 and 202 are made from two silicon wafers and one wafer is mounted on the other wafer. In another embodiment, layer 102 is made from a silicon-on-insulator (SOI) wafer, layer 202 is made from a glass wafer, and the SOI wafer is mounted on the glass wafer.

Figure 1B:
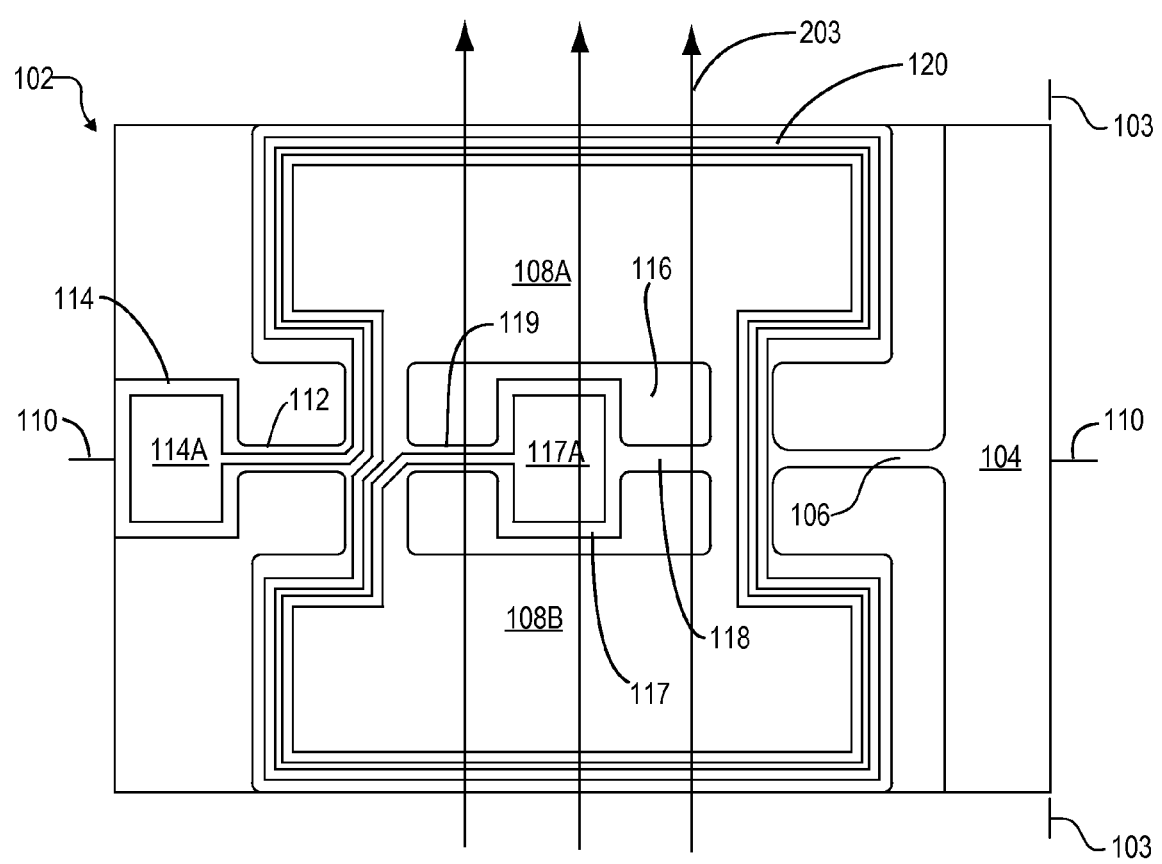
FIG. 1B illustrates partial top view of the upper layer in the MEMS mirror device of FIG. 1A along a vertical line of symmetry in one embodiment of the invention.

Referring to FIG. 1B, upper layer 102 includes a mirror 104 connected by a torsional hinge or spring 106 to a first end of a rotating frame 108 along a rotational axis 110. A second end of rotating frame 108 is connected by a torsional hinge or spring 112 to a bonding pad 114 along rotational axis 110.

In one embodiment, torsional hinge 106 is connected between mirror 104 and rotating frame 108.

Rotating frame 108 is a plate or beam-like structure having a body that defines one or more frame openings 116 (only one is illustrated for clarity). Each frame opening 116 accommodates a bonding pad 117. Opposing sides of each bonding pad 117 are connected by torsional hinges or springs 118 and 119 to rotating frame 108 along rotational axis 110.

Rotating frame 108 has two opposing sides 108A and 108B relative to rotational axis 110. A conductive coil 120 travels around the perimeter of sides 108A and 108B one or more times.

Sides 108A and 108B may extend further outward to provide room to form bonding pads (e.g., bonding pad 117) within rotating frame 108 that would properly mount to anchoring pads (e.g., anchoring pad 218 in FIG. 1C) below.

Wire bond pads 114A and 117A are formed on top of bonding pads 114 and 117 and connect to the two ends of conductive coil 120 over torsional hinges 112 and 119. Essentially conductive coil 120 travels from wire bond pad 114A on bonding pad 114, over torsional spring 112, around the perimeter of frame 108 a number of times, and over torsional spring 119 to wire bond pad 117A on bonding pad 117. Magnet and back yoke are arranged to form a magnetic field 203 that is perpendicular to the rotational axis but parallel to the layer 102. When an electric current passes through conductive coil 120, a force coupled along rotation axis 110 is formed to rotate frame 108 and mirror 104.

In one embodiment, the components of upper layer 102 are formed by etching a semiconductor wafer or an upper silicon layer of a SOI wafer.

Figure 1C:
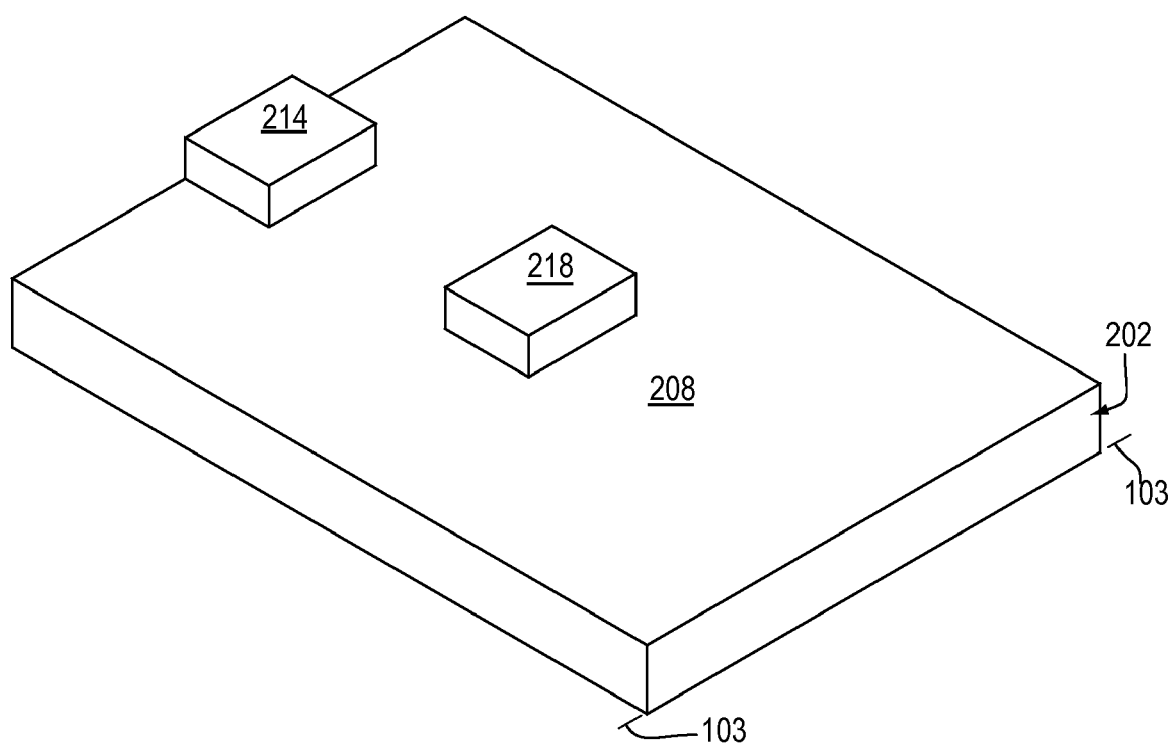
FIG. 1C illustrates a perspective cut-away view of the lower layer in the MEMS mirror device of FIG. 1A in one embodiment of the invention.

Referring to FIG. 1C, lower layer 202 includes anchoring pads 214 and 218 onto which bonding pads 114 and 117 (FIGS. 1A and 1B) are mounted in one embodiment. In this embodiment, the components of lower layer 202 are formed by etching a semiconductor wafer so all the appropriate components are structurally supported by a floor 208. The etching process also forms the clearance necessary to accommodate the rotation of mirror 104.

In another embodiment, anchoring pads 214 and 218 are formed by etching a lower silicon layer of a SOI wafer and bonded on a lower layer 202 that is a glass substrate. Note the upper silicon layer of the SOI wafer is etched to form the components of upper layer 102 as described above.

Figure 2:
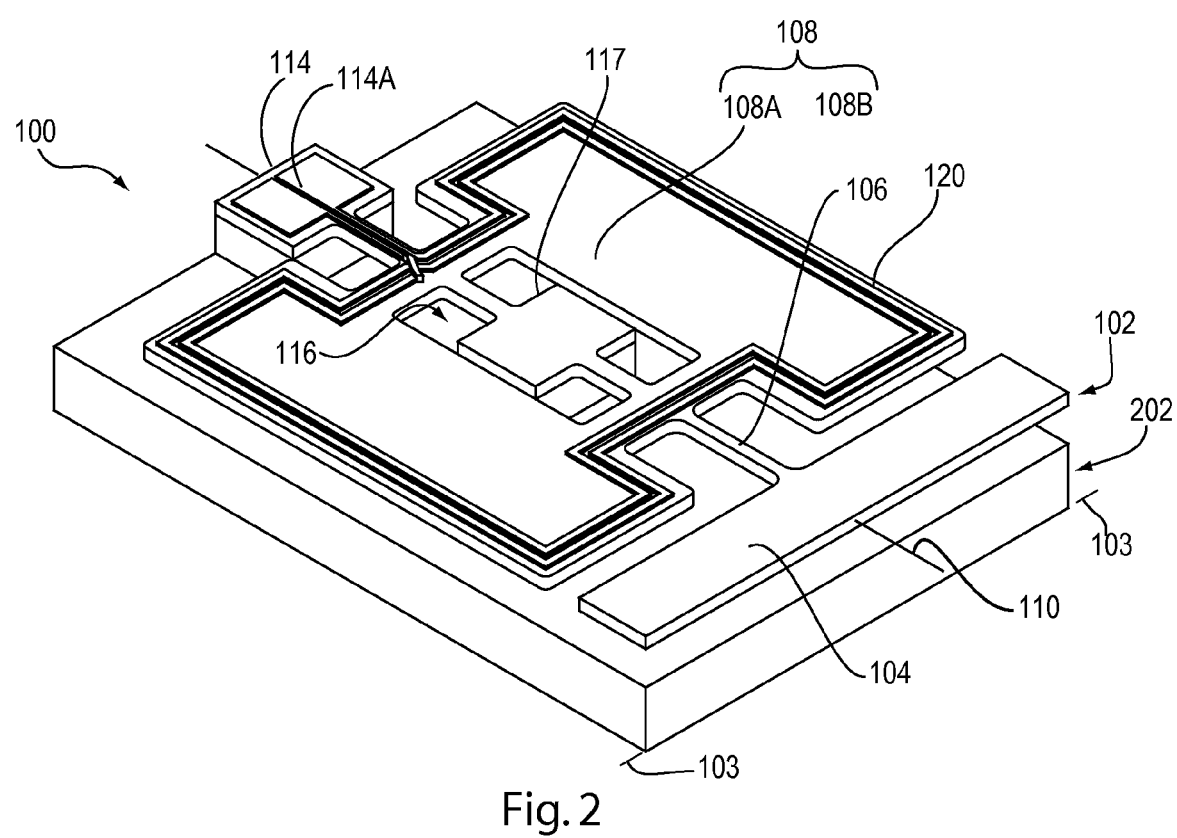
FIG. 2 illustrates a perspective cut-away view of a MEMS mirror device in another embodiment of the invention.

FIG. 2 illustrates MEMS device 100 with a different pattern for conductive coil 120 in one embodiment of the invention. In this embodiment, conductive coil 120 travels from wire bond pad 114A on bonding pad 114, over torsional spring 112, around the perimeter of frame 108 a number of times, and over torsional spring 119 to a wire bond pad 114B on bonding pad 114.

Figure 3:
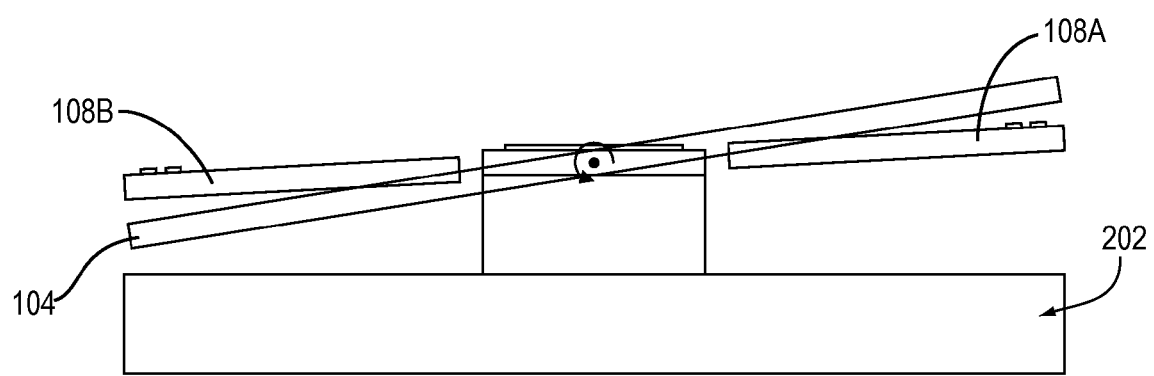
FIG. 3 illustrates a cross-sectional view of the MEMS mirror device of FIG. 1A in one embodiment of the invention.

FIG. 3 is now used to explain the design benefits of device 100 in one embodiment. It is a challenge to increase the mirror rotation angle and scanning speed with conventional arrangement. The hinge has to be stiff enough to increase its resonant frequency and it has to be compliant enough to allow large rotation angle and good reliability. The multiple hinges alleviate this issue but the increased weight of frame 108 prevents further improvement. To address this challenge, rotating frame 108 (FIGS. 1B, and 2) is torsionally, instead of fixedly, connected to mirror 104 (FIGS. 1B and 2) by torsional hinge 106 (FIGS. 1B and 2). As rotating frame 108 rotates, its rotational motion is transferred to mirror 104 by torsional hinge 106. Torsional hinge 106 in turn amplifies the rotational motion so that mirror 104 is rotated at a greater angle. The exact amplification of mirror 104 can be determined by studying the vibration mode shape through computer simulation of device 100. For example, to amplify the rotational amplitude of mirror 104 relative to the rotational amplitude of rotating frame 108, the stiffness of hinge 106 need to be reduced.

Device 100 can be operated in a variety of fashion. In one embodiment, the wire bond pads to conductive coil 120 receive a reference voltage (e.g., DC) to rotate frame 108 and mirror 104 statically. An oscillating voltage (e.g., an AC voltage source) can also be applied to the wire bond pads to oscillate frame 108 and mirror 104. An oscillating voltage with a steady voltage bias (e.g., an AC+DC voltage) can also be applied to the wire bond pads.

Figure 4:
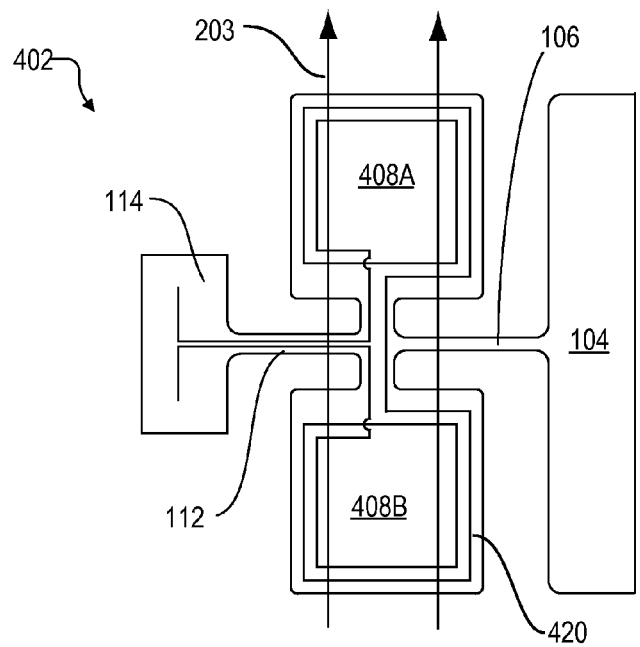
FIGS. 4 and 5 illustrate top views of the upper layers in MEMS mirror devices in other embodiments of the invention.

FIG. 4 illustrates an upper layer 402 of another MEMS mirror device in one embodiment of the invention. This mirror device is similar to mirror device 100 (FIG. 1A) but frame 108 has been reduced and the middle bonding pad 117 has been removed to form opposing sides 408A and 408B in order to reduce the die size. A conductive coil 420 is formed on top of sides 408A and 408B. Magnetic field 203 is arranged to have the flex direction perpendicular to the rotation axis and parallel to layer 402.

Figure 5:
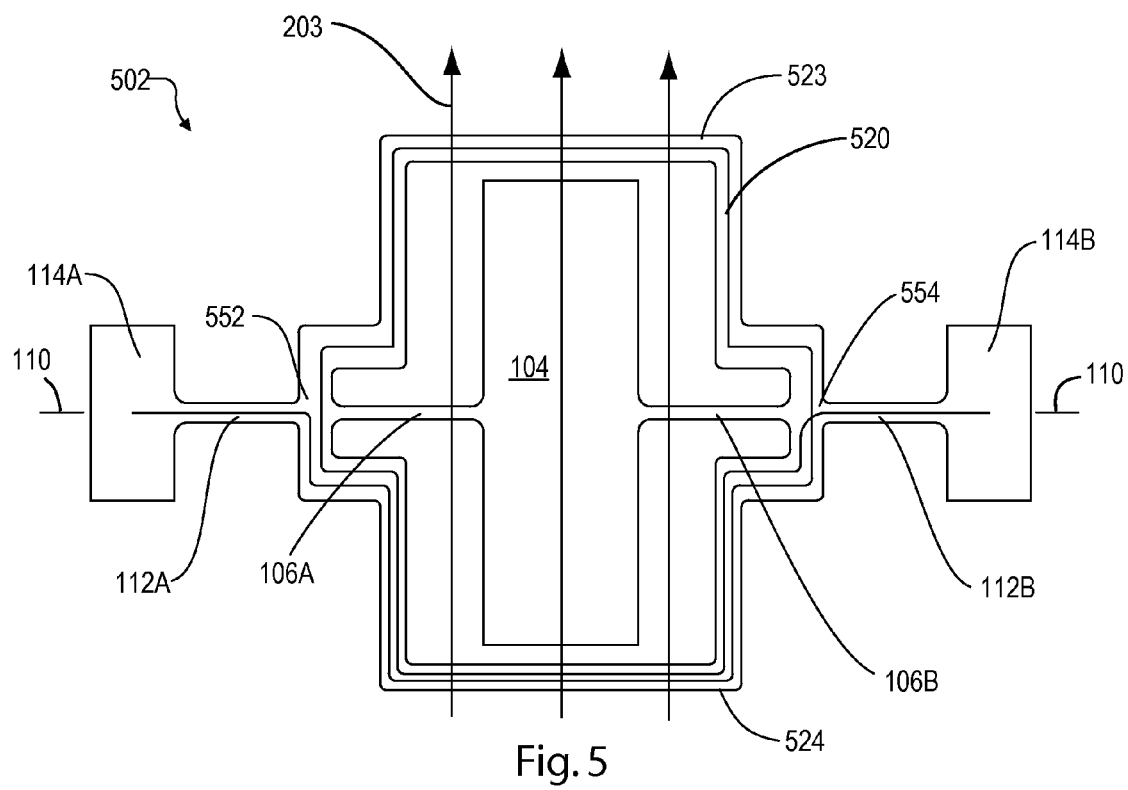

FIG. 5 illustrates an upper layer 502 of another MEMS mirror device in one embodiment of the invention. A support beam 523 forms an arch around mirror 104 and connects directly to (1) a junction 552 between inner hinge/spring 106A and outer hinge/spring 112A on a first side of mirror 104, and (2) a junction 554 between inner hinge/spring 106B and outer hinge/spring 112B on a second side of mirror 104. A supporting beam 524 forms an opposing arch extending from a second side of junctions 552 and 554 around mirror 104 (e.g., below rotational axis 110). Outer hinges 112A and 112B are connected to bonding pads 114A and 114B, respectively.

A conductive coil 520 is formed on top of support beams 523 and 524. Essentially coil 520 travels from bonding pad 114A over torsional spring 112A, around support beams 523 and 524 a number of times, and over torsional spring 112B to a bonding pad 114B. Magnetic field 203 is arranged to have the flex direction perpendicular to the rotation axis and parallel to layer 502.

In one embodiment, bonding pads 114A are mounted on anchoring pads 214 (FIG. 1C) on lower layer 202 (FIG. 1C). In this embodiment, layers 502 and 202 are made from two silicon wafers and the two wafers are mounted on each other. In another embodiment, anchoring pads 214 are formed by etching a lower silicon layer of a SOI wafer and bonded on a lower layer 202 that is a glass substrate. In this embodiment, the upper silicon layer of the SOI wafer is etched to form the components of upper layer 502.

Various other adaptations and combinations of features of the embodiments disclosed are within the scope of the invention. Numerous embodiments are encompassed by the following claims.

What is claimed is:

1. A micro-electro-mechanical system (MEMS) mirror device, comprising:
    a mirror;
    a rotating frame defining a frame opening;
    a first torsional hinge coupling the mirror and a first end of the rotating frame along a rotational axis;
    a first bonding pad in the frame opening;
    a second torsional hinge coupling the rotating frame and the first bonding pad along the rotational axis;
    a second bonding pad;
    a third torsional hinge coupling a second end of the rotating frame and the second bonding pad along the rotational axis; and
    a conductive coil that traverses the second bonding pad, the third torsional hinge, and around the rotating frame.

2. The MEMS mirror device of claim 1, wherein the conductive coil further traverses the second torsional hinge and the first bonding pad.

3. The MEMS mirror device of claim 1, wherein the conductive coil further traverses the third torsional hinge a second time and returns to the second bonding pad.

4. The MEMS mirror device of claim 1, further comprising a fourth torsional hinge coupling the rotating frame and the first bonding pad along the rotational axis.

5. The MEMS mirror device of claim 1, further comprising:
    a first anchoring pad onto which the first bonding pad is mounted; and
    a second anchoring pad onto which the second bonding pad is mounted.

6. A method for forming a micro-electro-mechanical system (MEMS) mirror device, comprising:
    forming a mirror;
    forming a rotating frame defining a frame opening;
    forming a first torsional hinge coupling the mirror and a first end of the rotating frame along a rotational axis;
    forming a first bonding pad in the frame opening;
    forming a second torsional hinge coupling the rotating frame and the first bonding pad along the rotational axis;
    forming a second bonding pad;
    forming a third torsional hinge coupling a second end of the rotating frame and the second bonding pad along the rotational axis; and
    forming a conductive coil that traverses the second bonding pad, the third torsional hinge, and around the rotating frame.

7. The method of claim 6, wherein the conductive coil further traverses the second torsional hinge and the first bonding pad.

8. The method of claim 6, wherein the conductive coil further traverses the third torsional hinge a second time and returns to the second bonding pad.

9. The method of claim 6, further comprising forming a fourth torsional hinge coupling the rotating frame and the first bonding pad along the rotational axis.

10. The method of claim 6, further comprising:
    forming a first anchoring pad onto which the first bonding pad is mounted; and
    forming a second anchoring pad onto which the second bonding pad is mounted.

11. The method of claim 10,
    wherein:
        said forming the mirror, the rotating frame, the first bonding pad, the second bonding pad, the first torsional hinge, the second torsional hinge, the third torsional hinge comprises etching a first wafer; and said forming the first anchoring pad and the second anchoring pad comprises etching a second wafer; and the method further comprises bonding the first wafer on the second wafer.

12. The method of claim 10, wherein:

wherein:

said forming the mirror, the rotating frame, the first bonding pad, the second bonding pad, the first torsional hinge, the second torsional hinge, the third torsional hinge comprises etching an upper layer of a silicon-on-insulator (SOI) wafer; and said forming the first anchoring pad and the second anchoring pad comprises etching a lower layer of the SOI wafer; and the method further comprises bonding the SOI wafer on a glass wafer.

* * * * *